United States Patent
Haegeman et al.

[11] Patent Number: 6,155,171
[45] Date of Patent: Dec. 5, 2000

[54] ELECTRO-PYROTECHNIC INITIATOR WITH THREE ELECTRICAL CONNECTIONS

[75] Inventors: Christophe Haegeman, Palaiseau; Christian Perotto, Ballancourt, both of France

[73] Assignee: Livbag Inc, Vert le Petit, France

[21] Appl. No.: 09/217,887

[22] Filed: Dec. 22, 1998

[30] Foreign Application Priority Data

Dec. 22, 1997 [FR] France .................................. 97 16217

[51] Int. Cl.$^7$ .............................. F42B 3/198; F42D 1/45
[52] U.S. Cl. .................................. 102/202.9; 102/202.5; 102/200
[58] Field of Search ............................. 102/202.9, 202.5, 102/200, 206

[56] References Cited

U.S. PATENT DOCUMENTS

| 2,386,211 | 10/1945 | Grant, Jr. . | |
| 3,426,682 | 2/1969 | Corren et al. | 102/202.9 |
| 5,334,025 | 8/1994 | Fohl | 439/188 |
| 5,544,585 | 8/1996 | Duguet . | |
| 6,070,531 | 6/2000 | Hansen et al. | 102/202.5 |

FOREIGN PATENT DOCUMENTS 0113 458  2/1984  European Pat. Off. .

Primary Examiner—Charles T. Jordon
Assistant Examiner—Lulit Semunegus
Attorney, Agent, or Firm—Pillsbury Madison & Sutro LLP

[57] ABSTRACT

The initiator (1) has a one-piece overmoulding (2) covering three pins (3, 4, 5) which constitute the three electrical connections of the said initiator (1). Two igniter heads (16, 17), each containing a heating resistive element, are fixed into the overmoulding (2) in such a way that, on the one hand, one of the three pins is common to the two heating resistive elements and, on the other hand, each of the other two pins (4 and 5) is connected to just one of the two heating resistive elements.

This electro-pyrotechnic initiator makes it possible to measure, in a mode of pyrotechnic non-activation, the resistance of each of the two heating resistive elements by successively passing electric test currents generated by an electronic control unit.

10 Claims, 6 Drawing Sheets

ELECTRO-PYROTECHNIC INITIATOR WITH THREE ELECTRICAL CONNECTIONS

The present invention relates to the field of pyrotechnic initiators and deals more specifically with an electro-pyrotechnic initiator intended for motor vehicle safety.

Electro-pyrotechnic initiators are traditionally built from two electrically conducting pins which are held in place by overmoulded insulation and the upper ends of which are joined together by a heating resistive filament which is encased in an igniter bead, and the lower ends of which are connected to a source of electrical current.

Such electro-pyrotechnic initiators are widely used to form devices for igniting pyrotechnic gas generators intended to inflate airbags to protect the occupants of a motor vehicle. However, the devices for igniting adaptive and/or progressive pyrotechnic gas generators, that is to say generators which, when coupled to appropriate detection systems, enable the flow rate and/or the volume of gas to be adapted to suit various parameters such as, for example, the nature and intensity of the impact, generally consist of several initiators, each of which requires its own electrical power supply, this considerably increasing cost and space occupancy.

Patent Application WO 97/16695, which relates to an adaptive pyrotechnic gas generator comprising two independent combustion chambers, discloses an initiator with two igniter heads and just one electric outlet which precisely allows the cost and space occupancy to be reduced. In a first embodiment of this initiator, the latter has two distinct resistors incorporated into a switching bridge comprising four switches which can switch in pairs and are combined with a switching circuit that is in the form of a diode circuit. In a second embodiment of this initiator, the latter comprises two different resistors mounted in parallel in an electric circuit. However, motor vehicle manufacturers would like, for safety reasons, to be able at any moment to check the value of each resistor incorporated into the initiator by successively passing electric test currents generated using an electronic control unit. However, because, in the first embodiment of the initiator, the junction voltage of the diodes used is too high and depends on temperature, it is impossible to reliably measure the resistance of the two resistors. In the second embodiment of the initiator, in order to be able to test each of the two resistors, it is therefore necessary, because these resistors have different resistances, to vary the strength of the electrical current delivered by the electronic control unit. This is relatively complicated to achieve and what is more, the use of two different resistances increases the number of steps necessary in assembling the initiator and therefore increases the cost of manufacture.

Those skilled in the art are therefore still in search of an electro-pyrotechnic initiator with just one electric outlet which is inexpensive and not very bulky and offers the possibility of testing, at any moment, the heating resistive elements that make up the initiator and therefore gain assurance of the electrical reliability of the latter.

The object of the invention is therefore to meet this need and the invention relates to an electro-pyrotechnic initiator comprising two igniter heads, characterized in that, i) each of the two igniter heads contains a heat-sensitive charge and a heating resistive element, ii) the two heating resistive elements are incorporated into an electric circuit which comprises three electrical connections, one of them being common to both heating resistive elements and the other two each being connected to one of the two heating resistive elements, iii) the three electrical connections are connected to an electrical power supply means originating from a control unit.

Thus, the three electrical connections of the initiator are each connected, via the electrical power supply means, to a control unit which is entirely conventional and therefore well known to those skilled in the art. In fact, each of the three electrical connections is connected to a separate electrical channel included in the control unit and which comprises a switch which can be opened or closed in turn. As a result:

In operation, the control unit sends an ignition order in the form of an electrical signal, closing:

on the one hand, the switch of the electrical channel of the control unit which is connected to the electrical connection of the initiator that is common to both heating resistive elements, if this switch was not already closed, and, on the other hand, one or both of the two switches relating to the other two electrical channels of the control unit. As a consequence, depending on whether these last two switches are open or closed, it is possible to initiate either just one igniter head of choice, or to initiate both igniter heads simultaneously or in succession. What happens is that the electrical signal, which may consist of a discharge of a capacitance or of a regulated pulse of current, then allows the chosen heating resistive element or elements to be heated by a Joule effect, and these elements themselves cause the heat-sensitive charge that corresponds to them to ignite.

In the mode of pyrotechnic non-activation of the initiator, the control unit passes far weaker successive electrical test signals which allow the two heating resistive elements to be tested. Each of these electrical test signals is obtained in safety by closing:

on the one hand, the switch of the electrical channel of the control unit which is connected to the electrical connection of the initiator that is common to both heating resistive elements, and, on the other hand, the switch of the electrical channel of the control unit which is connected to the electrical connection of the switch connected to the heating resistive element that is to be tested.

In addition, this electro-pyrotechnic initiator, which has been described hereinabove as comprising just two igniter heads, for reasons of simplicity, may be generalized to an electro-pyrotechnic initiator comprising at least two igniter heads, characterized in that, i) each of the said igniter heads contains a heat-sensitive charge and a heating resistive element, ii) the heating resistive elements are incorporated into an electric circuit which comprises at least three electrical connections, one of them being common to the heating resistive elements and the others each being connected to just one of the heating resistive elements, iii) the electrical connections are connected to an electrical power supply means originating from a control unit.

Thus, if this initiator has, for example, three igniter heads, each containing a heat-sensitive charge and a heating resistive element, then these three heating resistive elements must then be incorporated into an electric circuit comprising four electrical connections, one of them being common to all three heating resistive elements, and the other three each being connected to just one of the heating resistive elements. The way in which this initiator operates is in all other respects equivalent to the one described earlier.

According to a first alternative form of the invention, each of the three electrical connections consists of a pin.

As a preference, the electrical power supply means consists of an electric lead containing three connecting wires, each of the three pins being connected to one of the three connecting wires. Advantageously, the three connecting wires are inserted into an intermediate piece which plugs together with the three pins.

According to another feature of the invention, the two heating resistive elements are electrically connected to the pins via a transmission means.

According to a first preferred embodiment of the invention,
  i) each of the three pins can be broken down into a solid metal portion and a hollow metal portion,
  ii) overmoulding partially covers the three pins,
  iii) the heating resistive element contained in each of the two igniter heads is electrically connected, via two conductive metal bars which extend the said igniter head, to the hollow metal portion of the pin that is common to the two heating resistive elements and to the hollow metal portion of one of the other two pins.

Thus, in this preferred embodiment of the invention, the transmission means consists of the two conductive metal bars extending each of the two igniter heads, the latter being pre-constructed and remaining removable. Furthermore, currently-existing standard igniter heads may be used.

According to a second preferred embodiment of the invention:
  i) the electric circuit is built into a circuit of three conductive strips which are formed on a printed-circuit support, each of the three conductive strips being connected to one of the three pins,
  ii) the two heating resistive elements are fixed into the support of the printed circuit in such a way that one of the three said conductive strips is common to the two heating resistive elements and in such a way that the other two conductive strips are each connected to just one of the two heating resistive elements,
  iii) each of the two heating resistive elements is covered with the heat-sensitive charge which corresponds to it and which is itself contained in a fragmentable cap,
  iv) the two fragmentable caps are secured to overmoulding which partially covers the three pins and the printed-circuit support.

Thus, in this preferred embodiment of the invention, the transmission means consists of the circuit comprising three conducting strips which are formed on the printed-circuit support.

As a preference, the electrical circuit is partially covered with a layer of insulating varnish.

According to an alternative form of the invention, each of the three electrical connections consists of an electric wire. Each of these three electric wires may then have, on the one hand, a first end connected, for example, to one of the three connecting wires contained in an electric lead originating from the control unit and, on the other hand, a second end connected, as before, to a hollow metal element included in an overmoulding or alternatively to a printed-circuit support on which three conducting strips are formed.

The invention also relates to the use of an electro-pyrotechnic initiator according to the invention for igniting a pyrotechnic gas generator for the occupants of a motor vehicle.

The main advantages of this electro-pyrotechnic initiator over those which already exist are as follows:

The use of such an initiator in an appropriate adaptive and/or progressive pyrotechnic gas generator makes it possible to reduce both cost and space occupancy on the one hand, on account of the use of a single electrical power supply, for example achieved using an electric lead containing three connecting wires, instead of two electric power supplies and, on the other hand, on account of the use of heating resistive elements that are identical, making it possible to reduce the number of stages needed for assembling the initiator.

This initiator offers the possibility of being connected to an electronic control unit that already exists and is well known to those skilled in the art. To achieve this, all that is required is for each of the three electrical connections of the initiator to be connected to a separate and independent electric channel of the said electronic control unit. Furthermore, it is particularly advantageous to connect two generators each containing such an initiator to one and the same electronic control unit. This is because this type of assembly then requires just three pairs of electric channels instead of four, which is what is required when use is made of two generators each containing two initiators with separate electrical power supplies.

The two preferred embodiments of the invention will be described hereafter with reference to FIGS. 1 to 10.

Figure 1:
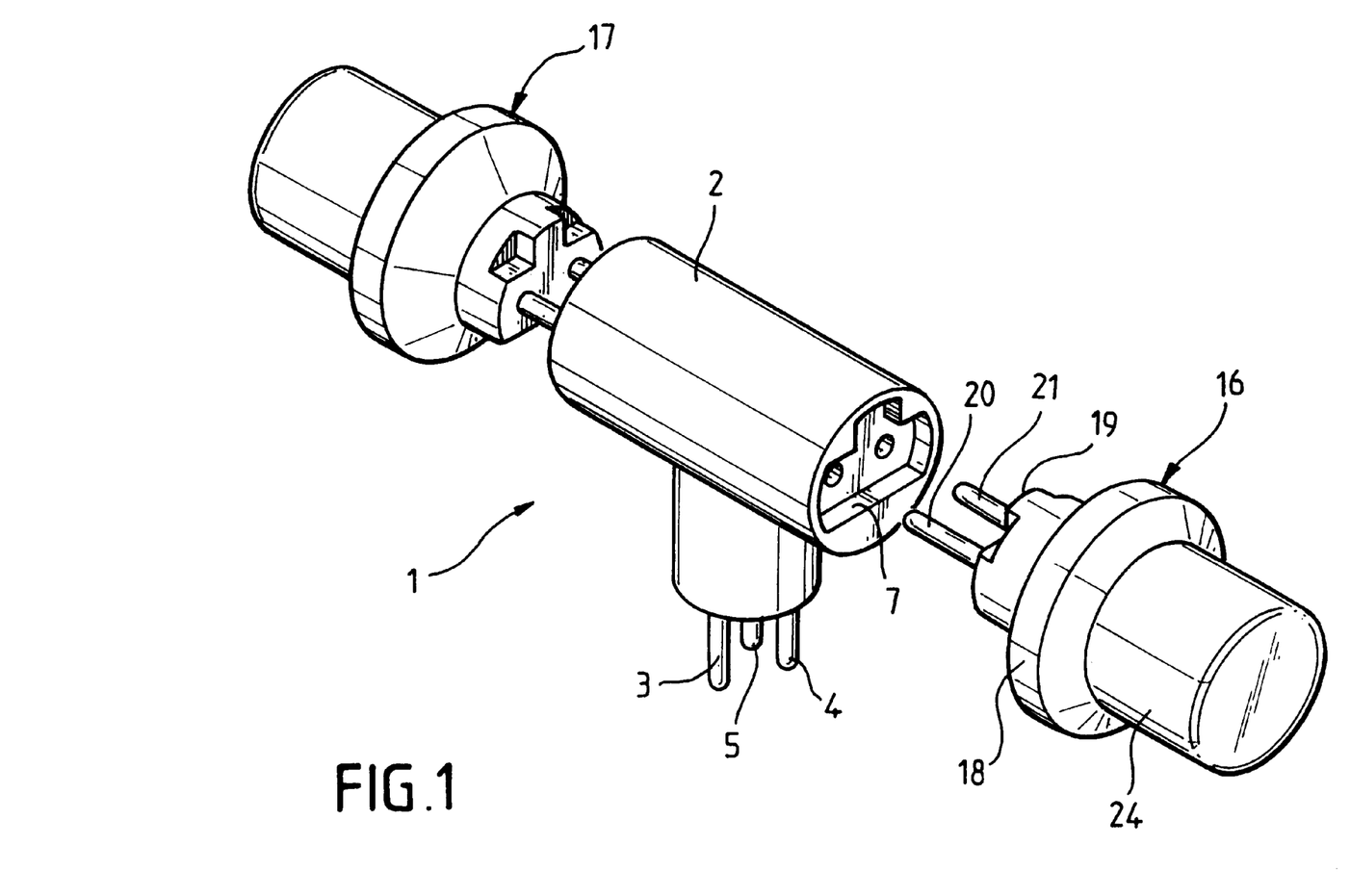
FIG. 1 is a perspective view of an electro-pyrotechnic initiator according to the first preferred embodiment of the invention.
Figure 2:
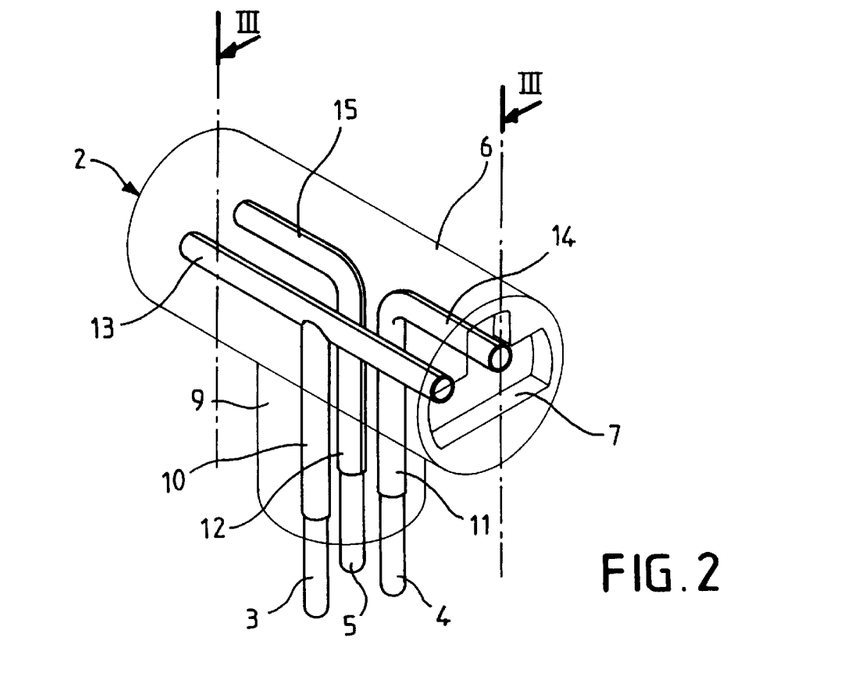
FIG. 2 is a perspective view of the overmoulding covering the three pins of the initiator depicted in FIG. 1.
Figure 3:
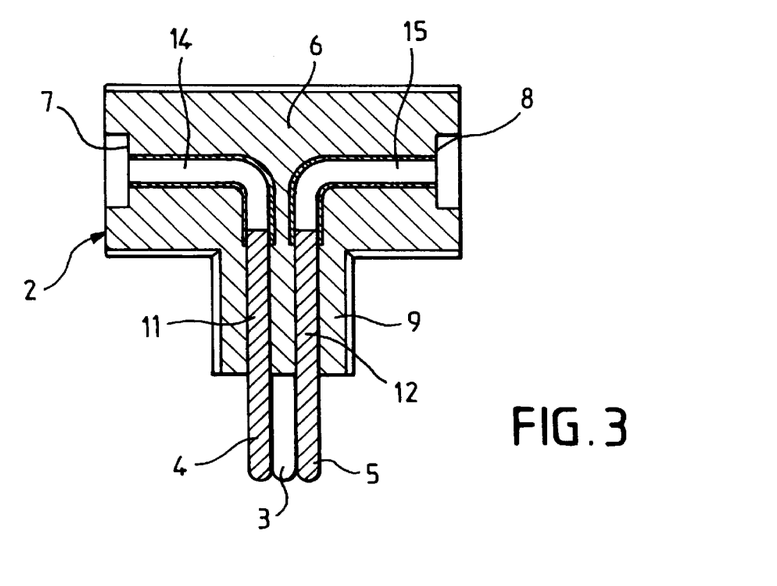
FIG. 3 is a view from the rear sectioned on III—III containing the independent pins of the overmoulding covering the three pins that is depicted in FIG. 2.

Referring to FIGS. 1 to 3, it can be seen that an electro-pyrotechnic initiator 1 according to the first preferred embodiment is built from one-piece overmoulding 2 made of an adhesive resin based on a hot-melt polyamide which partially covers three pins 3 to 5 constituting the three electrical connections of the said initiator 1. More specifically, the overmoulding 2 has, on the one hand, an elongate cylindrical part 6 comprising a cavity 7, 8 at each of its ends and, on the other hand, a cylindrical external branch-off 9. Each of the three pins 3 to 5 can be broken down respectively into a solid metal portion 10 to 12 and into a hollow metal portion 13 to 15. Where these portions are separate elements, each of the two solid metal elements 11 and 12 have an upper end soldered to a first end of the hollow metal element 14, 15 that corresponds to it and the solid metal element 10 has an upper end soldered to the body of the hollow metal element 13. The lower end of each of the three solid metal elements 10 to 12, which end is not included in the external cylindrical branch-off 9 of the overmoulding 2 is intended to be connected to an electrical power supply means, not depicted in the Figures. The hollow metal elements 13 to 15 are covered with the elongate cylindrical part 6 of the overmoulding 2 and the cavities 7 and 8 of the said elongate cylindrical part 6 of the overmoulding 2 each contain one of the two ends of the hollow metal element 13 and the second end of one of the two hollow metal elements 14 or 15. These ends are not covered with the overmoulding 2 and can, as described below, be used to fix the two igniter heads 16, 17 into the overmoulding 2.

The two igniter heads 16, 17 are rigorously identical to each other and therefore just one of the two igniter heads 16, 17 will be described. Thus, the igniter head 16 is, in the conventional way, built from a base 18 containing a heating resistive element on which there is deposited a heat-sensitive charge, the latter being held in place by a fragmentable cap 24 secured to the base 18. This heat-sensitive charge can advantageously be broken down into, on the one hand, a primary charge based on lead trinitroresorcinate and, on the other hand, a boosting charge consisting of a mixture of powder of the boron/potassium nitrate type and of nitro-cellulose single-base powder. The heating resistive element is made of a heating resistive strip defined by a printed sub-circuit as described in U.S. Pat. No. 5,544,585 or its counterpart FR-A-2,704,944, the description of which is included by reference in this description.

The base 18 has a projection 19 which is itself extended by two conducting metal bars 20, 21. These two metal bars 20, 21 are intended to be inserted into the two hollow metal elements 13 and 14, the open ends of which are contained in the cavity 7 of the elongate cylindrical part 6, and the projection 19, because of its special geometry, is designed to fit perfectly into the said cavity 7.

This initiator 1 is therefore particularly intended to be incorporated into a tubular pyrotechnic gas generator, the combustion chambers of which are coaxial.

Figure 4:
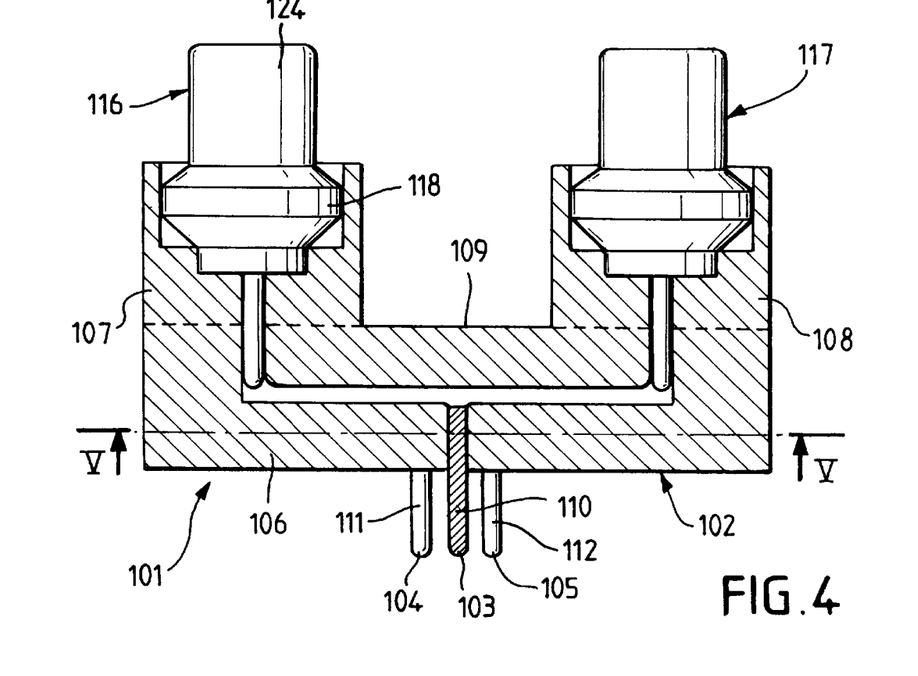
FIG. 4 is a front-on view, in section on IV—IV, of another electro-pyrotechnic initiator according to the first preferred embodiment of the invention.
Figure 5:
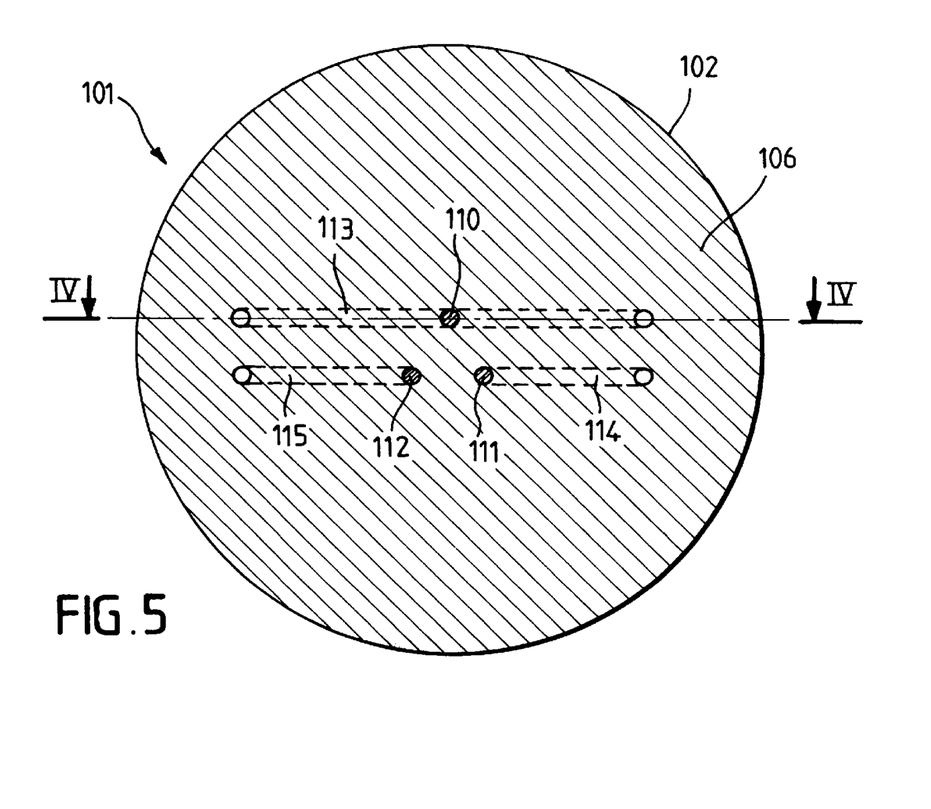
FIG. 5 is a view from below in section on V—V of the initiator depicted in FIG. 4.

Referring to FIGS. 4 and 5, it can be seen that another electro-pyrotechnic initiator 101 according to the first preferred embodiment is built from a one-piece overmoulding 102 made of an adhesive resin based on hot-melt polyamide which partially covers three pins 103 to 105 constituting the three electrical connections of the said initiator 101. More specifically, the overmoulding 102 has, on the one hand, a discoid base 106 and, on the other hand, two cylindrical projections 107 and 108 leaving a central cavity 109.

Each of the three pins 103 to 105 can be broken down respectively into a solid metal portion 110 to 112 and into a hollow metal portion 113 to 115. Where these portions are distinct elements, each of the two solid metal elements 111 and 112 has an upper end soldered to a first end of the hollow metal element 114, 115 which corresponds to it, and the solid metal element 110 has an upper end soldered to the body of the hollow metal element 113. The lower end of each of the three solid metal elements 110 to 112 which does not lie inside the discoid base 106 of the overmoulding 103 is intended to be connected to an electrical power supply means, not depicted in the Figures. The hollow metal elements 113 to 115 are covered with the discoid base 106 and the cylindrical projections 107 and 108 each contain one of the two ends of the hollow metal element 113 and the second end of one of the two hollow metal elements 114 or 115. These ends are not covered with the overmoulding 102 and allow the two igniter heads 116 and 117 to be fixed in.

These heads are rigorously identical to the two igniter heads described earlier. In effect, the igniter head 116, for example, comprises a base 118 to which is fitted a fragmentable cap 124 and which contains a heating resistive element and a heat-sensitive charge. The base 118 comprises a protrusion which is itself extended by two conducting metal bars. These are inserted into the two hollow metal elements 113 and 114, the open ends of which are contained in the cylindrical projection 107, and the protrusion nests perfectly in the cylindrical external cut-out of the cylindrical projection 107.

This initiator 101 is more specifically intended to be built into a pyrotechnic gas generator, the combustion chambers of which are not coaxial. This is because the central cavity 109 of the overmoulding 102 makes it easier for such an initiator 101 to be used in a generator in which the two combustion chambers are separated by a partition because this partition can easily be fitted into the central cavity 109. Each of the two combustion chambers then contains one of the two igniter heads 116 and 117.

Figure 6:
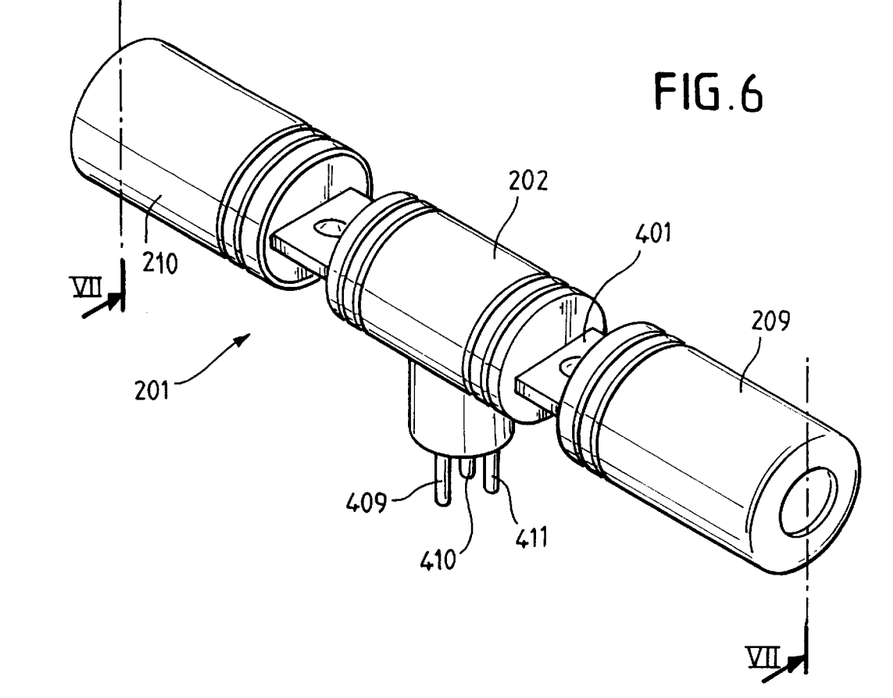
FIG. 6 is a perspective view of an electro-pyrotechnic initiator according to the second preferred embodiment of the invention.
Figure 7:
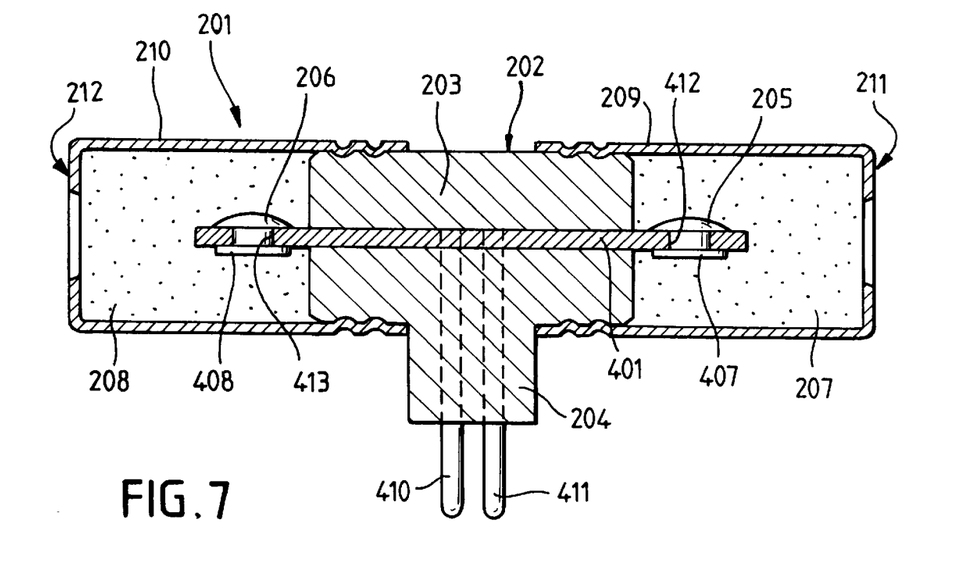
FIG. 7 is a view in section on the mid-plane VII—VII of the initiator depicted in FIG. 6.
Figure 8:
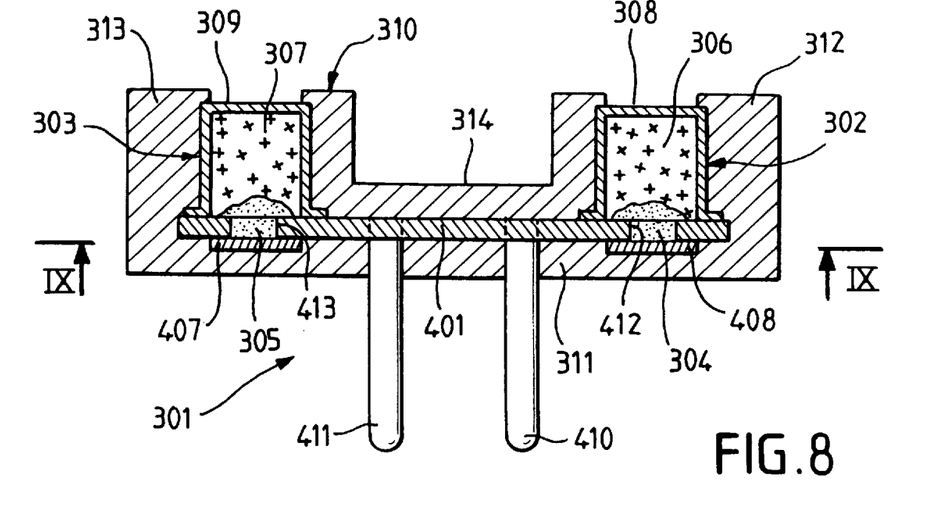
FIG. 8 is a front-on view, in section on VIII—VIII, of another electro-pyrotechnic initiator according to the second preferred embodiment of the invention.
Figure 9:
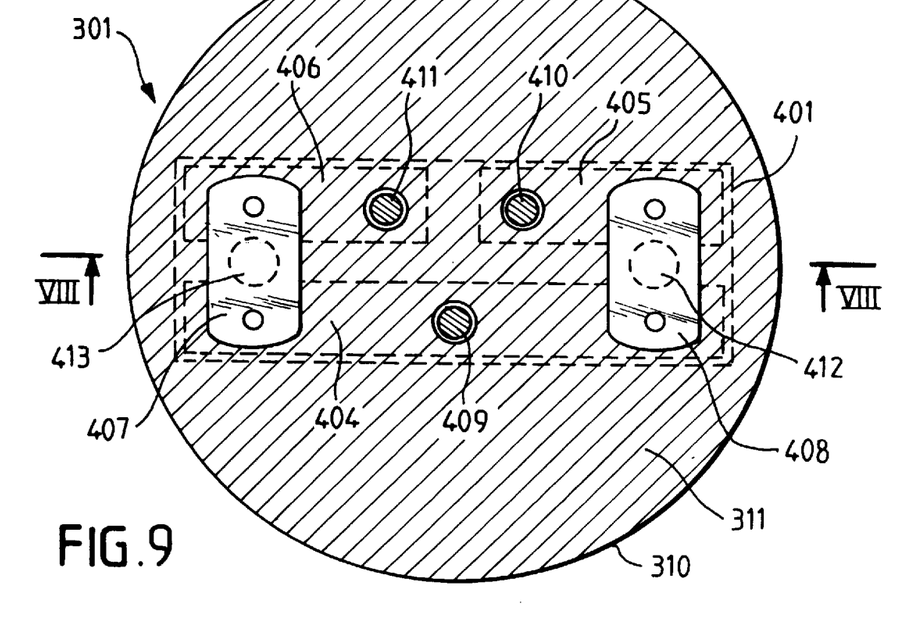
FIG. 9 is a view from below in section on IX—IX of the initiator depicted in FIG. 8.
Figure 10:
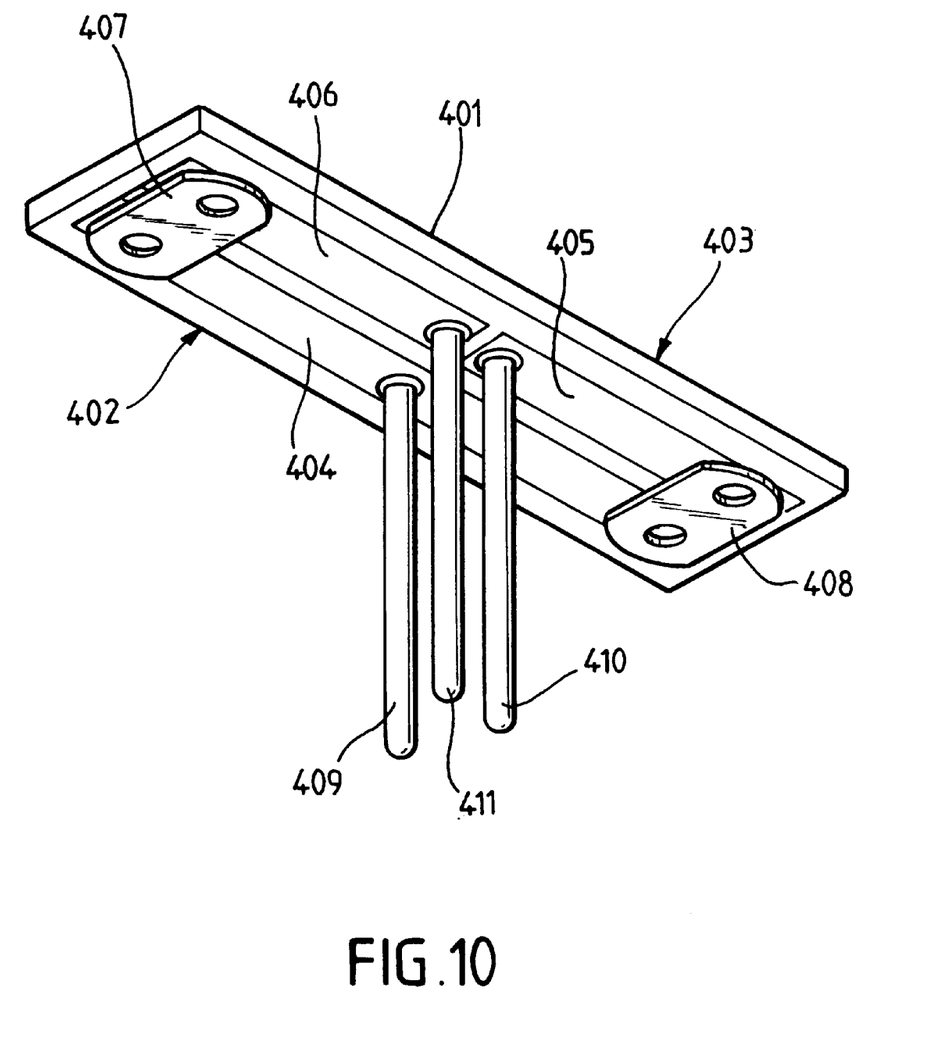
FIG. 10 is a view from below and in perspective of the printed-circuit support and of the three conductive strips, the three pins and the two heating resistive elements which are included in the initiators depicted in FIGS. 6 to 9.

Referring now to FIGS. 6, 7 on the one hand, and to FIGS. 8, 9 on the other hand, it can be seen that an electro-pyrotechnic initiator 201, 301 according to the second preferred embodiment of the invention, is made from a printed-circuit support 401 having the shape of a thin parallelepipedal board. Referring more specifically to FIG. 10, it can be seen that this support 401, which is made of glass-fibre-filled epoxy resin, comprises a lower face 402 and an upper face 403. Three distinct conductive strips 404 to 406 of identical width and parallel to the longest edge of the support 401 are printed on the lower face 402, a first strip 404 being slightly shorter than the longest edge and the other two strips 405 and 406 being in line.

Each of the two conductive strips 405 and 406 is connected to the conductive strip 404 using a heating resistive element 407, 408, which was described earlier. Each of the three conductive strips 404 to 406 is connected by soldering to a pin 409 to 411, itself set into the support 401. The lower face 402 of the support 401 is partially covered with a layer of insulating varnish, only those zones of the support 401 in which, on the one hand, the heating resistive elements 407, 408 are bonded and, on the other hand, the three pins 404 to 406 are set, remain uncovered. The support 401 has holes 412, 413 facing each of the two heating resistive elements 407, 408.

Referring more specifically to FIGS. 6 and 7, it can be seen that the initiator 201 is made of a one-piece overmoulding 202. The latter has, on the one hand, an elongate cylindrical part 203 which covers the support 401 with the exception of the zones of attachment of the two heating resistive elements 407, 408 and, on the other hand, an external cylindrical branch-off 204 which covers the three pins 409 to 411 over part of their length. Two igniter heads 211 and 212 are built up from the two holes 412 and 413 which are each covered with a primary charge 205, 206, itself immersed in a booster charge 207, 208 contained in a fragmentable cap 209, 210. Each open end of the two fragmentable caps 209, 210 is fixed, for example, by crimping, to one of the two ends exhibited by the elongate cylindrical part 203 of the overmoulding 202. The respective chemical compositions of the various charges employed are identical to those described earlier.

Referring more specifically to FIGS. 8 and 9, it can be seen that the initiator 301 is made of a one-piece overmoulding 310 made of an adhesive resin based on hot-melt polyamide which completely covers the support 401, the three conductive strips 404 to 406 and the two heating resistive elements 407, 408. More specifically, the overmoulding 310 has, on the one hand, a discoid base 311 and, on the other hand, two cylindrical projections 312 and 313 leaving a central cavity 314. The discoid base 311 covers the three pins 409 to 411 over part of their length and each of the two cylindrical projections 312, 313 contains an igniter head 302, 303. These two igniter heads 302 and 303 are built up from the holes 412 and 413 which are each covered with a heat-sensitive charge which can be broken down into, on the one hand, a primary charge 304, 305 and, on the other hand, a boosting charge 306, 307, the chemical compositions of these various charges incidentally being identical to those described earlier. Two fragmentable caps 308, 309, each of which encloses one of the two heat-sensitive charges, have an open end pressing against the support 401 and are each covered by the cylindrical projection 312, 313 which corresponds to them.

What is claimed is:

1. Electro-pyrotechnic initiator (1, 101, 201, 301) comprising two igniter heads (16 and 17, 116 and 117, 211 and 212, 302 and 303), characterized in that,
   i) each of the two igniter heads (16 and 17, 116 and 117, 211 and 212, 302 and 303) contains a heat-sensitive charge and a heating resistive element (407, 408),
   ii) the two heating resistive elements (407, 408) are incorporated into an electric circuit which comprises three electrical connections, one of them being common to both heating resistive elements (407 and 408) and the other two each being connected to one of the two heating resistive elements (407, 408),
   iii) the three electrical connections are connected to an electrical power supply means originating from a control unit.

2. Initiator according to claim 1, characterized in that each of the three electrical connections consists of a pin (3, 4, 5, 409, 410, 411).

3. Initiator according to claim 2, characterized in that the electrical power supply means consists of an electric lead containing three connecting wires, each of the three pins (3, 4, 5, 409, 410, 411) being connected to one of the three connecting wires.

4. Initiator according to claim 3, characterized in that the three connecting wires are inserted into an intermediate piece which plugs together with the three pins (3, 4, 5, 409, 410, 411).

5. Initiator according to any one of claims 2 to 4, characterized in that the two heating resistive elements (407, 408) are electrically connected to the pins (3, 4, 5, 409, 410, 411) via a transmission means.

6. Initiator according to claim 5, characterized in that
   i) each of the three pins (3, 4, 5) can be broken down into a solid metal portion (10, 11, 12) and a hollow metal portion (13, 14, 15),
   ii) overmoulding (2) partially covers the three pins (3, 4, 5),
   iii) the heating resistive element contained in each of the two igniter heads (16, 17) is electrically connected, via two conductive metal bars (20, 21) which extend the said igniter head, to the hollow metal portion (13) of the pin (3) that is common to the two heating resistive elements and to the hollow metal portion (14, 15) of one of the other two pins (4, 5).

7. Initiator according to claim 5, characterized in that,
   i) the electric circuit is built into a circuit of three conductive strips (404, 405, 406) which are formed on a printed-circuit support (401), each of the three conductive strips (404, 405, 406) being connected to one of the three pins (409, 410, 411),
   ii) the two heating resistive elements (407 and 408) are fixed into the support (401) of the printed circuit in such a way that one of the three conductive strips is common to the two heating resistive elements (407 and 408) and in such a way that the other two conductive strips (405 and 406) are each connected to just one of the two heating resistive elements (407, 408),
   iii) each of the two heating resistive elements (407, 408) is covered with the heat-sensitive charge which corresponds to it and which is itself contained in a fragmentable cap (209, 210),
   iv) the two fragmentable caps (209 and 210) are secured to overmoulding (202) which partially covers the three pins (409, 410, 411) and the printed-circuit support (401).

8. Initiator according to claim 7, characterized in that the electric circuit is partially covered with a layer of insulating varnish.

9. Initiator according to claim 1, characterized in that each of the three electrical connections consists of an electric wire.

10. Use of an electro-pyrotechnic initiator according to any one of claims 1 to 9 for igniting a pyrotechnic gas generator for the occupants of a motor vehicle.

* * * * *